(12) United States Patent
Taylor et al.

(10) Patent No.: US 9,938,632 B2
(45) Date of Patent: Apr. 10, 2018

(54) APPARATUS AND METHOD FOR RECOVERY OF MATERIAL GENERATED DURING ELECTROCHEMICAL MATERIAL REMOVAL IN ACIDIC ELECTROLYTES

(71) Applicants: E. Jennings Taylor, Troy, OH (US); Maria E. Inman, Yellow Springs, OH (US); Brian T. Skinn, Union, OH (US); Timothy D. Hall, Englewood, OH (US); Stephen T. Snyder, Englewood, OH (US); Savidra C. Lucatero, Dayton, OH (US); Eric Lee Kathe, Ballston Lake, NY (US)

(72) Inventors: E. Jennings Taylor, Troy, OH (US); Maria E. Inman, Yellow Springs, OH (US); Brian T. Skinn, Union, OH (US); Timothy D. Hall, Englewood, OH (US); Stephen T. Snyder, Englewood, OH (US); Savidra C. Lucatero, Dayton, OH (US); Eric Lee Kathe, Ballston Lake, NY (US)

(73) Assignee: FARADAY TECHNOLOGY, INC., Englewood, OH (US)

( * ) Notice: Subject to any disclaimer, the term of this patent is extended or adjusted under 35 U.S.C. 154(b) by 34 days.

(21) Appl. No.: 14/845,759

(22) Filed: Sep. 4, 2015

(65) Prior Publication Data
US 2016/0230303 A1    Aug. 11, 2016

Related U.S. Application Data

(60) Provisional application No. 62/114,278, filed on Feb. 10, 2015, provisional application No. 62/120,621, filed on Feb. 25, 2015.

(51) Int. Cl.
*C25C 1/06* (2006.01)
*C25C 1/08* (2006.01)
(Continued)

(52) U.S. Cl.
CPC .................. *C25F 7/02* (2013.01); *C25C 1/06* (2013.01); *C25C 1/08* (2013.01); *C25C 1/12* (2013.01);
(Continued)

(58) Field of Classification Search
CPC .... C25C 1/12; C25C 5/02; C25C 7/00; C25C 7/02; C25C 1/00; C25C 1/08; C25C 3/00; C25C 3/34; C25C 7/08
(Continued)

(56) References Cited

U.S. PATENT DOCUMENTS 3,630,865 A    12/1971    Minklei et al.
5,819,400 A    10/1998    Sargeant
(Continued)

OTHER PUBLICATIONS

Skinn et al., "Electrochemical Machining Recycling for Metal Recovery and Waste Elimination," presented at ASME 2014 International Manufacturing Science and Engineering Conference, Jun. 9, 2014-Jun. 13, 2014, pp. 1-7.
(Continued)

*Primary Examiner* — Zulmariam Mendez
(74) *Attorney, Agent, or Firm* — Thompson Hine LLP

(57) ABSTRACT

A method for recycling metallic material produced by an electrochemical material removal process. The method includes flowing an electrolyte solution between an anode workpiece and a cathode tool in a first electrolytic process, the first electrolytic process including applying a first electrolytic current and voltage between the anode workpiece and the cathode tool and thereby causing metal ions to be removed from the anode workpiece and dissolved and substantially retained in the electrolyte solution. The electrolyte solution with the metal ions therein is passed between an electrowinning cathode and an electrowinning anode in a second electrolytic process, the second electrolytic process including applying a second electrolytic current and voltage
(Continued)

between the electrowinning cathode and the electrowinning anode and thereby causing the metal ions to be removed from the electrolyte solution and deposited onto the electrowinning cathode.

15 Claims, 9 Drawing Sheets

(51) Int. Cl.
   *C25C 7/02*    (2006.01)
   *C25F 7/02*    (2006.01)
   *C25C 1/12*    (2006.01)
   *C25C 1/24*    (2006.01)
   *C25C 7/00*    (2006.01)
   *C25C 7/06*    (2006.01)

(52) U.S. Cl.
   CPC .................. *C25C 1/24* (2013.01); *C25C 7/00* (2013.01); *C25C 7/02* (2013.01); *C25C 7/06* (2013.01); *Y02P 10/212* (2015.11)

(58) Field of Classification Search
   USPC ........................................................ 205/574
   See application file for complete search history.

(56) References Cited

U.S. PATENT DOCUMENTS

| | | | |
|---|---|---|---|
| 6,402,931 | B1 | 6/2002 | Zhou et al. |
| 6,554,571 | B1 | 4/2003 | Lee et al. |
| 6,558,231 | B1 | 5/2003 | Taylor |
| 6,644,921 | B2 | 11/2003 | Bunker et al. |
| 2005/0023151 | A1* | 2/2005 | Sandoval .................. C25C 1/12 205/574 |
| 2009/0183997 | A1 | 7/2009 | Marsden et al. |
| 2011/0114500 | A1* | 5/2011 | Cardarelli ............... C22B 7/007 205/349 |
| 2011/0176608 | A1 | 7/2011 | Kim et al. |
| 2011/0303553 | A1 | 12/2011 | Inman et al. |

OTHER PUBLICATIONS

PCT, International Search Report and Written Opinion, International Application No. PCT/US2016/016726 (dated Apr. 15, 2016).
Taylor, et al. "A Pulse/Pulse Reverse Electrolytic Approach to Electropolishing and Through-Mask Electroetching," http://www.pfonline.com/articles/a-pulsepulse-reverse-electrolytic-approach-to-electropolishing-and-through-mask-electroteching (retrieved from the internet on Jul. 30, 2014).
Rajurkar, et al. "New Developments in Electro-Chemical Machining," Annals of the CIRP, vol. 82 pp. 2 (1999).
Wessel, "Electrochemical Machining of Gun Barrel Bores and Rifling," Naval Ordnance Station, Louisville KY, (Sep. 1978).

* cited by examiner (PRIOR ART) FIG. 1

APPARATUS AND METHOD FOR RECOVERY OF MATERIAL GENERATED DURING ELECTROCHEMICAL MATERIAL REMOVAL IN ACIDIC ELECTROLYTES

CROSS-REFERENCE TO RELATED APPLICATIONS

This application claims priority to U.S. Provisional Patent Application No. 62/114,278 filed Feb. 10, 2015, and U.S. Provisional Patent Application No. 62/120,621, filed Feb. 25, 2015, the entireties of which are incorporated by reference herein.

GOVERNMENT RIGHTS

This invention was made with government support under Contract Nos. W15QKN-12-C-0010 and W15QKN-12-C-0116 awarded by the U.S. Army, and Contract No. EP-D-13-040 awarded by the U.S. Environmental Protection Agency. The government has certain rights in the invention.

TECHNICAL FIELD

The present invention generally relates to electrochemical material removal processes including electrochemical machining, electrochemical polishing, electrochemical through-mask etching, or electrochemical deburring of metals and metal alloys. More particularly, the invention relates to an electrochemical material removal process whereby the removed material can be dissolved in an acidic or buffered acidic electrolyte and recovered and recycled in a subsequent integrated process.

BACKGROUND

Electrochemical machining, electrochemical polishing, electrochemical through-mask etching, and electrochemical deburring are examples of electrochemical material removal processes whereby metal is removed from a work piece by an anodic electrochemical reaction.

In electrochemical machining, the counter electrode or cathode consists of a geometric shape which can be a mirror image of the approximate desired final geometric shape of the machined work piece, and material is removed by an anodic electrochemical reaction. Electrochemical machining processes are often used in the manufacturing of gun barrels where the internal surface is rifled as described in, for example, U.S. Pat. No. 5,819,400, the entirety of which is hereby incorporated by reference herein. In electrochemical polishing, asperities are selectively removed by an anodic electrochemical reaction that can result in a smooth work piece surface, for example as described in published U.S. Patent Application No. 2011/0303553 by Inman, the entirety of which is hereby incorporated by reference herein.

In electrochemical through-mask etching, material is removed by an anodic electrochemical reaction through a mask on a workpiece surface as described in, for example, published U.S. Patent Application No. 2011/0176608 by Taylor, the entirety of which is hereby incorporated by reference herein.

In electrochemical deburring, rough edges and burrs are removed by an anodic electrochemical reaction as described in, for example, a Pulse/Pulse Reverse Electrolytic Approach to Electropolishing and Through-Mask Electroetching, in Products Finishing Magazine Online by Taylor, posted Sep. 26, 2011, the entirety of which is hereby incorporated by reference herein. The removal of material by an anodic electrochemical reaction as described herein is understood to include electrochemical machining, electrochemical polishing, electrochemical through-mask etching, electrochemical deburring, and the like, and these terms are used interchangeably to describe the electrochemical removal of material. Compared to mechanical machining processes such as mechanical cutting, thermal machining, electric discharge machining, or laser cutting, electrochemical material removal is a non-contact machining process that typically does not result in a mechanically or thermally damaged surface layer on the machined work piece. Electrochemical material removal can have strong utility as a manufacturing technology for fabrication of a wide variety of metallic parts and components.

As reported by Rajurkar (K. P. Rajurkar, D. Zhu, J. A. McGeough, J. Kozak, A. De Silva, "New Developments in Electro-Chemical Machining" *Annals of the CIRP* Vol 82(2) 1999), the entirety of which is hereby incorporated by reference herein, electrochemical machining can have numerous advantages relative to traditional machining. These advantages include applicability to hard and difficult to cut materials, low tool wear, high material removal rate, smooth bright surface finish, and/or capability to produce parts with complex geometries. For example, electrochemical machining can be used for the production of helicopter engines (e.g., U.S. Pat. No. 6,554,571, the entirety of which is hereby incorporated by reference herein), artillery projectiles, large caliber cannon, turbine cooling technology (e.g., U.S. Pat. No. 6,644,921, the entirety of which is hereby incorporated by reference herein), and/or gun barrels.

While electrochemical material removal can have many advantages from the perspective of component manufacturing, one impediment to wider adoption is that the material removed from the workpiece can form an insoluble metal hydroxide and/or hydrated metal oxide sludge. The metal containing sludge is typically filtered, dried, and shipped to third party vendors for disposal in a landfill and/or recycling at considerable cost.

For example, as reported in Electrochemical Machining of Gun Barrel Bores and Rifling by Wessel ("Electrochemical Machining of Gun Barrel Bores and Rifling," Naval Ordnance Station, Louisville Ky., September 1978. http://handle.dtic.mil/100.2/ADA072437"), the entirety of which is hereby incorporated by reference herein, during the boring and rifling process in a neutral or slightly alkaline sodium nitrate electrolyte for a 5 inch gun barrel, in which approximately 250 in$^3$ of metal is removed, approximately 350 gallons of centrifuged metal containing electrolyte sludge can be produced. This volume of sludge is approximately 80,000 in$^3$—more than 300 times the volume of the solid metal removed.

Accordingly, those skilled in the art seek an alternative to conventional electrochemical material removal whereby the generation of large volumes of insoluble metal containing sludge is substantially avoided and/or the valuable removed materials can be recycled.

SUMMARY

One advantage of the invention includes the recycling and recovery of materials removed during an electrochemical material removal process. Another advantage of the invention includes minimization of water use either as water bound to insoluble sludge and/or in the form of insoluble oxyhydroxide species. Another advantage of the invention includes elimination or minimization of the volume of material which must often be disposed of off-site (e.g., a landfill) after electrochemical material removal, or otherwise disposed of at considerable expense. Another advantage of the invention is speed of the recovery of the material removed during the electrochemical removal process. Other advantages and benefits will be readily apparent to those of ordinary skill based on the disclosures herein.

In one aspect, the invention involves a method for recycling metallic material produced by an electrochemical material removal process. The method involves flowing an electrolyte solution between an anode workpiece and a cathode tool in a first electrolytic process. The method also involves applying a first electrolytic current and voltage between the anode workpiece and the cathode tool to cause metal ions to be removed from the anode workpiece, the removed metal ions being substantially dissolved in the electrolyte solution, where the first electrolytic current and voltage causes the removed metal ions to remain dissolved in the electrolyte solution. The method also involves flowing the electrolyte solution, including substantially dissolved metal ions, between an electrowinning cathode and an electrowinning anode in a second electrolytic process. The method also involves applying a second electrolytic current and voltage between the electrowinning cathode and the electrowinning anode to cause the substantially dissolved metal ions to be removed from the electrolyte solution and deposited onto the electrowinning cathode. The method may also involve recycling the metal ions deposited onto the electrowinning cathode.

In some embodiments, the first electrolytic current and voltage and the second electrolytic current and voltage are such that the dissolved metal ions from the first electrolytic process are deposited onto the electrowinning cathode in the second electrolytic process. In some embodiments, the first electrolytic current and voltage to be one of a direct current and voltage, a pulsed current and voltage, or a pulse reverse current and voltage. In some embodiments, the second electrolytic current and voltage to be one of a direct current and voltage, a pulsed current and voltage, or a pulse reverse current and voltage.

In some embodiments, the method also involves applying a bipolar waveform between the anode workpiece and cathode tool to prevent the metal ions removed from the anode workpiece from being deposited onto the cathode tool. In some embodiments, the method also involves adjusting the second pulsed voltage waveform to cause a rate at which the dissolved metal ions are deposited onto the electrowinning cathode to be approximately equal to a rate at which metal ions are removed from the anode. In some embodiments, the adjustment of the first pulsed voltage waveform comprises adjusting a duty cycle to between about 10 to 60%, and the adjustment of the second pulsed current waveform comprises adjusting a duty cycle to between about 50 to 100%. In some embodiments, the anode workpiece includes copper or a copper alloy, for example C18000 copper alloy, and the electrolyte includes $NaNO_3$, $NH_4NO_3$, $HNO_3$, or combinations thereof. In some embodiments, the concentration of $NaNO_3$ and $NH_4NO_3$ are each about 100 grams per liter, and a volume fraction of $HNO_3$ is about 1%. In some embodiments, the anode workpiece includes iron or an iron alloy, for example SAE4150 steel, and the electrolyte includes about 200 g/L of ammonium sulfate, about 5 g/L of sulfuric acid, and about 2.65 g/L of citric acid. In other embodiments, the anode workpiece is a nickel alloy, for example IN718 nickel superalloy, and the electrolyte includes about 120 g/L citric acid, 20 g/L boric acid, 1.5% v/v $HNO_3$, and 1.3% v/v HCl.

In some embodiments, the method also involves adjusting a pH level of the electrolyte between one and three times per day, or as often as needed. In some embodiments, a spacing between the electrowinning cathode and the electrowinning anode is held constant at about one inch and a peak voltage applied between the electrowinning cathode and the electrowinning anode is held constant at about 20 to about 30 volts. In some embodiments, the method also involves removing, cleaning, replacing, or any combination thereof, the electrowinning cathode on a periodic basis, for example on a daily basis. In some embodiments, the method also involves maintaining a concentration of the substantially dissolved metal ions between about 1000 and about 3000 parts per million. The target metal ion concentration is selected to avoid adverse effects on the electrochemical machining unit operation, to facilitate recovery in the electrowinning unit operation, and in conjunction with the selection of waveform parameters to avoid or minimize plating on the cathode tool in the electrochemical machining unit operation. In some embodiments, the method also involves circulating the electrolyte at a flow rate of about 4.8 gallons per minute.

In another aspect, the invention features an apparatus for recycling machined metal produced by an electrochemical material removal process. The apparatus includes an electrolyte flowing between an anode workpiece and a cathode tool, the electrolyte undergoing electrochemical reactions with the anode workpiece and the cathode tool, with metal ions being removed from the anode workpiece by an anodic electrochemical reaction and substantially dissolved in the electrolyte. The apparatus also includes a first pulse generator, providing a voltage or current waveform between the anode workpiece and the cathode tool to cause the electrochemical reactions between the anode workpiece, cathode tool, and the electrolyte, and to prevent precipitation of the metal ions substantially dissolved in the electrolyte. The apparatus also includes an electrowinning cathode and an electrowinning anode in fluid communication with the electrolyte. The apparatus also includes a second pulse generator, providing a voltage or current waveform between the electrowinning anode and the electrowinning cathode to cause the metal ions substantially dissolved in the electrolyte to be removed from the electrolyte solution and deposited onto the electrowinning cathode, wherein the resultant metal deposited onto the electrowinning cathode can be recycled.

In some embodiments, the first pulse generator provides a bipolar waveform between the anode workpiece and the cathode tool to prevent the metal ions removed from the anode workpiece from being deposited onto the cathode tool. In some embodiments, the second pulse generator can be adjusted to provide a waveform that causes the rate at which the dissolved metal ions are deposited onto the electrowinning cathode to be approximately equal to the rate at which metal ions are removed from the anode workpiece. In some embodiments, the apparatus also includes a plurality of electrowinning anodes and a plurality of electrowinning cathodes. In some embodiments, a number of the plurality of electrowinning cathodes and/or a number of the plurality of the electrowinning anodes can be removed to adjust the rate of electrowinning.

In some embodiments, the apparatus also includes a fluid reservoir to buffer chemical differences in the electrolyte at the anode workpiece and cathode tool and electrowinning cathode and the electrowinning anode. In some embodiments, the differences comprise differences in pH and temperature. In some embodiments, the electrolyte, the anode workpiece, the cathode tool, the electrowinning anode, and the electrowinning cathode are contained in a vessel. In some embodiments, the voltage or current waveform provided by the first pulse waveform generator is one of a direct current or voltage waveform, a pulsed voltage or current waveform, or a pulse reverse voltage or current waveform. In some embodiments, the voltage or current waveform provided by the second pulse waveform generator is one of a direct current or voltage waveform, a pulsed voltage or current waveform, or a pulse reverse voltage or current waveform. In some embodiments, the voltage or current waveforms provided by the first and second pulse waveform generators are selected such that dissolved metal ions are deposited onto the electrowinning cathode in the second electrolytic process.

In one aspect, a method for recycling metallic material produced by an electrochemical material removal process is disclosed. The method includes flowing an electrolyte solution between an anode workpiece and a cathode tool in a first electrolytic process, the first electrolytic process including applying a first electrolytic current and voltage between the anode workpiece and the cathode tool and thereby causing metal ions to be removed from the anode workpiece and dissolved and substantially retained in the electrolyte solution. The electrolyte solution with the metal ions therein is passed between an electrowinning cathode and an electrowinning anode in a second electrolytic process, the second electrolytic process including applying a second electrolytic current and voltage between the electrowinning cathode and the electrowinning anode and thereby causing the metal ions to be removed from the electrolyte solution and deposited onto the electrowinning cathode.

In another aspect, a system for recycling machined metal produced by an electrochemical material removal process is disclosed. The system includes an apparatus with a machining unit including an anode to receive a workpiece, a cathode tool, and a first pulse generator to provide a voltage or current waveform between the anode and the cathode tool. The system also includes an electrowinning unit with an electrowinning cathode, an electrowinning anode, and a second pulse generator to provide a voltage or current waveform between the electrowinning anode and the electrowinning cathode. The machining unit is in fluid communication with the electrowinning unit.

Other aspects of the disclosed system and method for the recycling and recovery of materials removed during an electrochemical material removal process will become apparent from the following description, the accompanying drawings and the appended claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
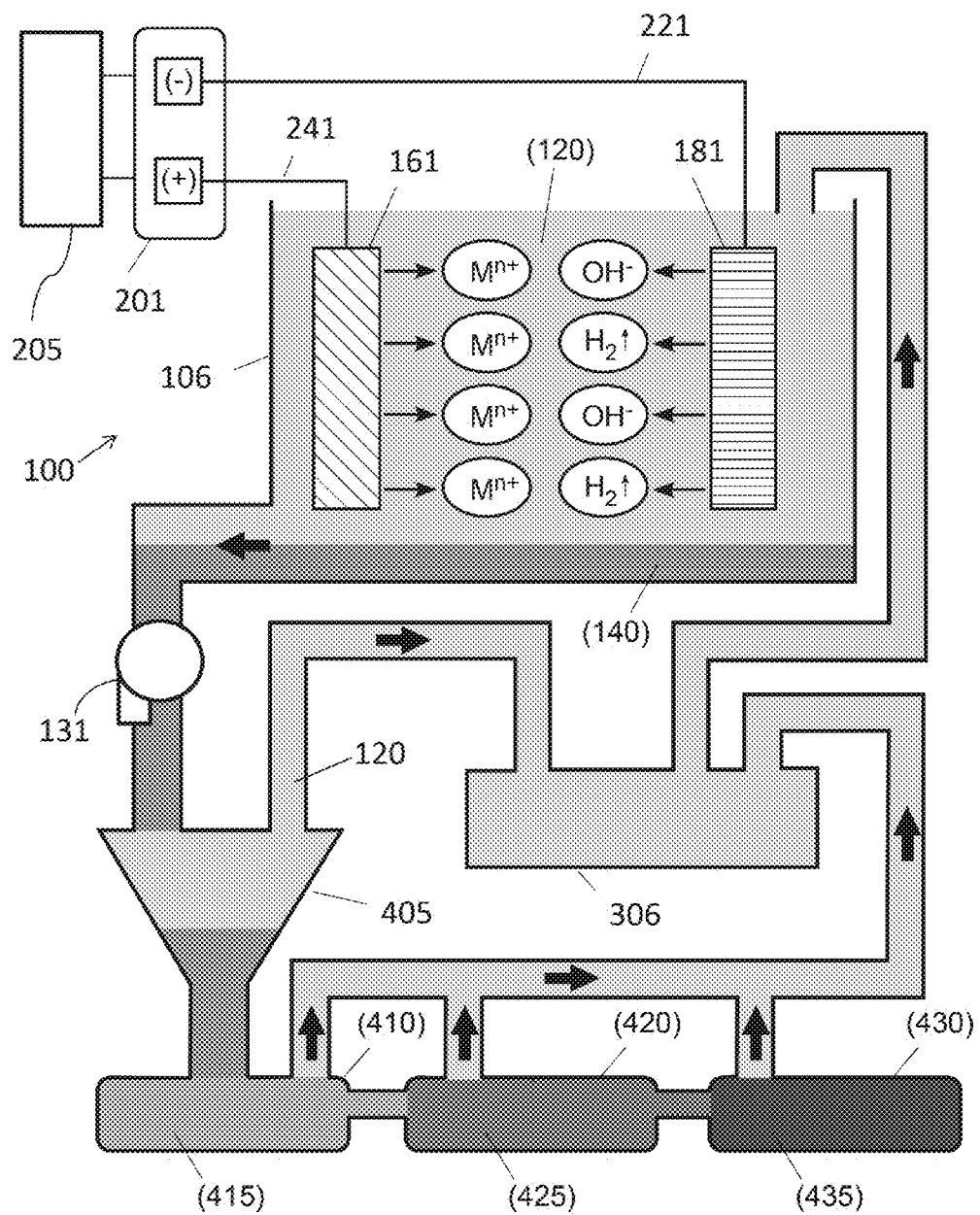
FIG. 1 is a block diagram of a conventional electrochemical machining apparatus, according to an example of the prior art.

FIG. 1 depicts a conventional electrochemical machining apparatus 100. The conventional electrochemical machining apparatus 100 includes an electrochemical machining cell 106 that houses an anode workpiece 161 and a cathode tool 181. The electrochemical machining apparatus 100 also includes a rectifier 201, an anode lead 241, a cathode lead 221, a power source 205, a fluid pump 131, an electrolyte balancing tank 306, a clarifier 405, a filter 410, a filter press 420, and a sludge drier 430. FIG. 1 also shows a hydroxyl-generating electrolyte 120, a metal sludge 140, a filtered sludge 415, a filter pressed sludge 425, and a dried sludge 435.

The hydroxyl-generating electrolyte 120 is in fluid communication with the anode workpiece 161, the cathode tool 181, the clarifier 405, the electrolyte balancing tank 305, the filter 410, the filter press 420, and the sludge dryer 430. The anode workpiece 161 and the cathode tool 181 are electrically connected to a power source 205 by an anode lead 241, a cathode lead 221, and a rectifier 201.

During operation, the fluid pump 131 pumps the hydroxyl-generating electrolyte 120, causing the hydroxyl-generating electrolyte 120 to circulate throughout the electrochemical machining apparatus. The power source 205 applies a voltage or current to the anode workpiece 161 and the cathode tool 181 via the cathode lead 221, the anode lead 241, and the rectifier 201. The applied voltage or current causes electrochemical reactions between the anode workpiece 161, the cathode tool 181, and the hydroxyl-generating electrolyte 120. Exemplary electrochemical reactions for metals which are oxidized to divalent or trivalent ions are as follows:

Divalent

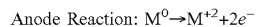
Anode Reaction: $M^0 \rightarrow M^{+2} + 2e^-$

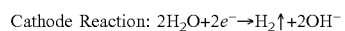
Cathode Reaction: $2H_2O + 2e^- \rightarrow H_2\uparrow + 2OH^-$

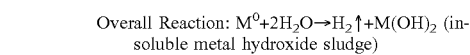
Overall Reaction: $M^0 + 2H_2O \rightarrow H_2\uparrow + M(OH)_2$ (insoluble metal hydroxide sludge)

Trivalent

Anode Reaction: $2M^0 \rightarrow 2M^{+3} + 6e^-$

Cathode Reaction: $6H_2O + 6e^- \rightarrow 3H_2\uparrow + 6OH^-$

Overall Reaction: $2M^0 + 6H_2O \rightarrow 3H_2\uparrow + M_2O_3 \cdot 3H_2O$
(insoluble metal oxide sludge)

One skilled in the art would understand that similar reactions occur for metals which oxidize to other valent ions and for metals which oxidize to more than one valence ions.

Still referring to FIG. 1, at the anode workpiece 161, a metal of the anode loses electrons and becomes oxidized. At the cathode 181, $H_2O$ combines with the lost electrons and forms a hydrogen gas and hydroxide. The combination of the reaction at the cathode 181 and the reaction at the anode workpiece 161 leads to the production of insoluble metal hydroxide sludge 140.

The metal sludge 140 passes through a clarifier 405 and a filter 410, and becomes filtered sludge 415. The filtered sludge 415 then passes through a filter press 420 and becomes filter pressed sludge 425. The filter pressed sludge 425 is then dried in a sludge dryer 430, becoming dried sludge 435. The dried sludge 435 can be shipped to a third party to be recycled and is typically removed periodically from the sludge dryer 430.

The electrolyte balancing tank 306 can buffer differences in the hydroxyl-generating electrolyte 120 at the clarifier 405, the filter 410, the filter press 420, the sludge dryer 430, and/or the electrochemical machining cell 106. For example, the electrolyte balancing tank 306 can buffer differences in pH and temperature. In some embodiments, the balancing tank 306 is not present.

Figure 2:
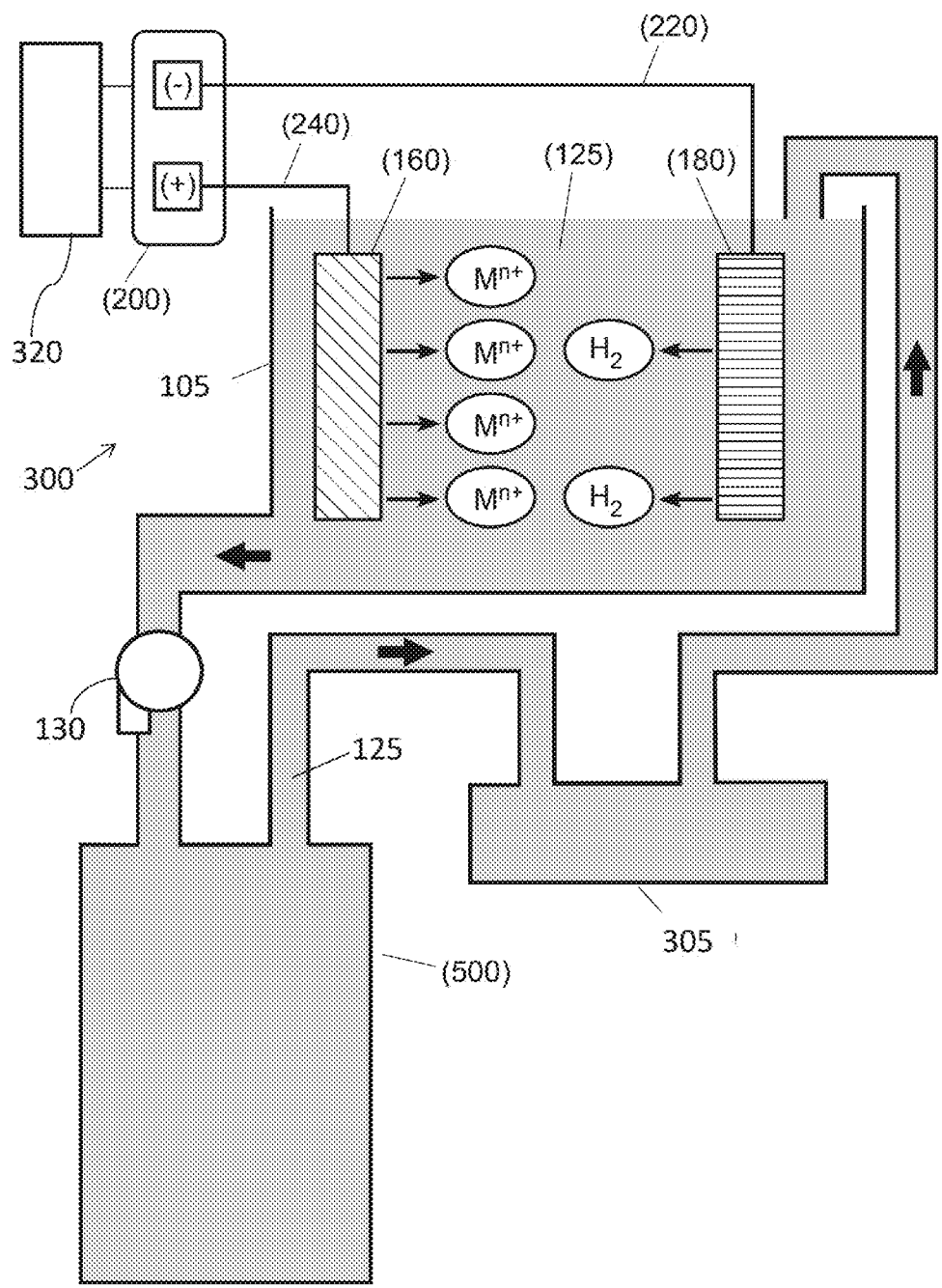
FIG. 2 is block diagram of an electrochemical machining and recycling apparatus, according to an illustrative embodiment of the invention.
Figure 3:
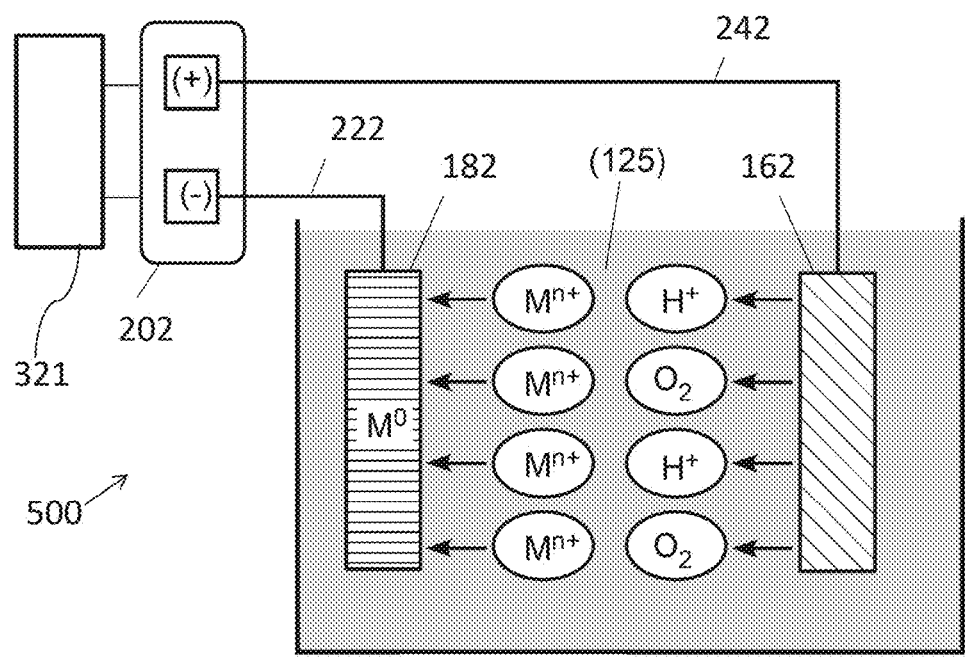
FIG. 3 is a block diagram of an electrowinning unit, according to an illustrative embodiment of the invention.

FIGS. 2 and 3 show an electrochemical machining and recycling system 300 in accordance with an embodiment of the present invention. The electrochemical machining and recycling system 300 includes an electrochemical machining unit operation 105 and an electrowinning unit operation 500 (shown in more detail in FIG. 3) with a common soluble-metal-ion-generating (or containing) electrolyte 125. In one embodiment, the electrolyte 125 is an acidic electrolyte. The electrochemical machining and recycling system 300 also includes a fluid pump 130, an electrolyte balancing tank 305, a waveform generator 320, a rectifier 200, an anode lead 240, and a cathode lead 220. The electrochemical machining unit operation 105 includes an anode workpiece 160, a cathode tool 180, and a soluble-metal-ion-generating electrolyte 125.

The soluble-metal-ion-generating electrolyte 125 is in fluid communication with the anode workpiece 160, the cathode tool 180, the electrowinning unit operation 500, and the electrolyte balancing tank 305. The anode workpiece 160 and the cathode tool 180 are electrically connected to a waveform generator 320 by an anode lead 240, a cathode lead 220, and a rectifier 200.

During operation, the fluid pump 130 pumps the soluble-metal-ion-generating electrolyte, causing the soluble-metal-ion-generating electrolyte 125 to circulate throughout the electrochemical machining and recycling system 300, including the electrochemical machining unit operation 105 and the electrowinning unit operation 500. The soluble-metal-ion-generating electrolyte 125 is suitable for both the electrochemical machining process and also the electrowinning process. The waveform generator 320 applies a waveform to the anode workpiece 160 and the cathode tool 180 via the anode lead 240, the cathode lead 220, and the rectifier 200. The applied waveform causes electrochemical reactions between the anode workpiece 160, the cathode tool 180, and the soluble-metal-ion-generating electrolyte 125.

Exemplary electrochemical reactions in accordance with an electrochemical machining/removal process and a paired electrowinning process for a divalent metal in accordance with an embodiment of the present disclosure are as follows:

Reactions in Machining Unit 105

Anode Reaction: $M^0 \rightarrow M^{+2} + 2e^-$

Cathode Reaction: $2H^+ + 2e^- \rightarrow H_2\uparrow$

Overall Reaction: $M^0 + 2H^+ \rightarrow H_2\uparrow + M^{+2}$ (soluble metal ion)

Reactions in Electrowinning Unit 500

Cathode Reaction: $M^{+2} + 2e^- \rightarrow M^0$

Anode Reaction: $H_2O \rightarrow \frac{1}{2}O_2\uparrow + 2H^+ + 2e^-$

Overall Reaction: $M^{+2} + H_2O \rightarrow \frac{1}{2}O_2\uparrow + 2H^+ + M^0$ (recovered metal)

Net Reaction of System 300

$H_2O \rightarrow \frac{1}{2}O_2\uparrow + H_2\uparrow$

Exemplary electrochemical reactions in accordance with an electrochemical machining/removal process and a paired electrowinning process for a trivalent metal in accordance with an embodiment of the present disclosure are as follows:

Reactions in Machining Unit 105

Anode Reaction: $2M^0 \rightarrow 2M^{+3} + 6e^-$

Cathode Reaction: $6H^+ + 6e^- \rightarrow 3H_2\uparrow$

Overall Reaction: $2M^0 + 6H^+ \rightarrow 3H_2\uparrow + 2M^{+3}$ (soluble metal ion)

Reactions in Electrowinning Unit 500

Cathode Reaction: $2M^{+3} + 6e^- \rightarrow 2M^0$

Anode Reaction: $3H_2O \rightarrow 3/2 O_2\uparrow + 6H^+ + 6e^-$

Overall Reaction: $2M^{+3} + 3H_2O \rightarrow 3/2 O_2\uparrow + 6H^+ + 2M^0$ (recovered metal)

Net Reaction of System 300

$H_2O \rightarrow \frac{1}{2}O_2\uparrow + H_2\uparrow$

In contrast to the conventional electrochemical machining apparatus 100 of the prior art, which generates an insoluble metal containing sludge 140, the electrochemical machining and recycling does not generate an insoluble metal containing sludge. Rather, the metal ion generated at the anode in the machining unit 105 is retained in the electrolyte solution 125 and transported while solubilized in the solution 125 to the electrowinning unit 500. The dissolved metal ions are recovered as solid metal on the electrowinning cathode 182 during the operation of the electrowinning unit 500. Further, as discussed in greater detail below, the waveform parameters employed in the machining unit 105 may incorporate cathodic pulses to prevent or minimize plating of the dissolved metal ion on the cathode tool 181, and/or to otherwise assist in the retention of the metal ion in a solubilized form in the electrolyte solution 125.

Though described above with respect to divalent and trivalent metals, it should be appreciated that similar reactions occur for metals which oxidize to soluble ions of a different valence and for metals which oxidize to soluble ions of more than one valence state and that these dissolved ions are recovered as solid metal on the electrowinning cathode 182 in the electrowinning unit operation and the generation of an insoluble sludge is avoided.

Still referring to FIG. 2, at the anode workpiece 160, oxidized metal ions from the anode lose electrons and migrate into the electrolyte solution, becoming dissolved in the soluble-metal-ion-generating electrolyte 125. At the cathode tool 180, protons combine with the lost electrons and form a hydrogen gas. The combination of the reaction at the cathode tool 180 and the reaction at the anode workpiece 160 leads to production of hydrogen gas and soluble metal ions. The soluble metal ions are removed from the soluble-metal-ion-generating electrolyte 125 by the electrowinning unit operation 500. The electrolyte balancing tank 305 buffers any differences in the soluble-metal-ion-generating electrolyte 125 at the electrowinning unit operation 500 and the electrochemical machining unit operation 105. For example, the electrolyte balancing tank 305 can buffer differences in pH and temperature.

The waveform generator 320 of the machining unit 105 can provide forward pulses (i.e. anodic pulses) or, in some embodiments, forward and reverse pules (i.e. alternating anodic and cathodic pulses) to the anode workpiece 160 and the cathode tool 180. In an embodiment incorporating both forward and result pulses, the workpiece 160 is net anodic, and the tool 180 is net cathodic. The electrolyte can be generally acidic or buffered acidic and can be selected so that the metal ions removed during the electrochemical machining process remain dissolved in solution, though in some embodiments, the electrolyte may be basic (and necessarily undergo different chemistry than described above) if the metal can be machined in the basic electrolyte and the metal ion may be solubilized therein for an electrowinning process. The waveform parameters can be chosen in order to effectively perform the electrochemical machining operation (e.g., in order to provide a desired electrochemically machined surface on the workpiece 160, and to avoid or minimize the electrochemical deposition of the dissolved metal ions on the cathode tool 180). The application of cathodic (i.e., reverse) pulses can cause the dissolved metal ions to remain in solution, and/or further prevent or minimize electrochemical deposition of dissolved metal on the cathode tool 180. The waveform generator 320 can provide pulsed waveforms having an adjustable duty cycle and amplitude, and additionally, the waveform generator 320 can provide bipolar voltages (e.g., alternating anodic and cathodic pulses) to the anode workpiece 160 and the cathode tool 180.

The anode workpiece 160 can be comprised of any metal that can be electrochemically machined. In some embodiments, the anode workpiece 160 could be or could include C18000 copper alloy, SAE4150 steel, IN718 (INCONEL® is a registered trademark of Speciality Metals Corporation), or STELLITE® 25 (STELLITE® is a registered trademark of Kennametal Stellite, or the like. In some embodiments, the anode workpiece 160 can be a high strength steel, nickel, nickel alloy, titanium, a titanium alloy, niobium, a niobium alloy, molybdenum, a molybdenum alloy, tungsten, a tungsten alloy, rhenium, a rhenium alloy, nickel-titanium shape memory alloys, tantalum, a tantalum alloy, aluminum, an aluminum alloy, a chrome-copper alloy, a cobalt-chrome alloy, or a tantalum-tungsten alloy.

Various electrochemical processes can be performed in the electrochemical machining unit operation 105, including electrochemical machining, electrochemical polishing, electrochemical through-mask etching, electrochemical deburring, and the like.

The electrolyte 125 is selected for suitability for use in both the electrochemical machining unit operation and also the electrowinning unit operation for the particular metal or metal alloy of the anode workpiece 160. The electrolyte 125 can be a mixture of the salts of various cations and anions. The cations can include ammonium ($NH_4^+$), sodium, and/or potassium. The anions can include chloride, bromide, nitrate, sulfate, and/or phosphate. The electrolyte can also include the cation hydroxides (e.g., sodium hydroxide) or the anion acids (e.g., nitric acid). The electrolyte can also include various additives, for example buffers to control pH and/or complexants to prevent or minimize precipitation of solubilized metal. Suitable pH additives for certain embodiments include, but are not limited to, boric acid, phosphate salts, organic amines such as triethanolamine and glycerine, non-complexing buffers such as oxo-anions such as PIPES (piperazine-N,N'-bis(2-ethanesulfonic acid)), MES (2-(N-morpholino)ethanesulfonic acid), and MOPS(3-(N-morpholino)propansulfonic acid), phosphoric acid, sulfuric acid, and organic carboxylates/sulfonates such as acetic acid, formic acid, methanesulfonic acid, and p-toluenesulfonic acid, and the like, or combinations thereof. Suitable complexants for certain embodiments include, but are not limited to, aminocarboxylates and hydroxylcarboxylates such as glycine, alanine, glutamic acid, NTA, and EDTA, citric acid, tartaric acid, malonic acid, and oxalic acid, and unsaturated heterocyclic organics such as pyridine, salicylaldoxime, and 1, 10-phenanthroline, and the like, or combinations thereof.

In some embodiments, the electrochemical machining and recycling system 300 may include isolation valves (not shown) that can stop a flow of the soluble-metal-ion-generating electrolyte 125 between the electrowinning unit operation 500 and the electrochemical machining unit operation 105. Closing of the isolation valves can allow for removal of the electrowinning unit operation 500 or the electrochemical machining unit operation 105 without otherwise disturbing the other components of recycling system 300.

In some embodiments, closing of the isolation valves can allow for troubleshooting of the electrochemistry in the electrochemical machining unit operation 105 without the influence of the electrowinning unit operation 500. In some embodiments, any deposits formed on the cathode tool 180 (for example, plating of metal from the electrolyte 125) can be removed by applying a cathodic pulse of a duration sufficient to remove the deposits. For example, the cathodic pulse duration can be determined based on parameters related to an electrochemical material removal process (e.g. anodic pulse length and surface quality of the cathode).

FIG. 3 shows a block diagram of an electrowinning unit operation 500 in accordance with an embodiment of the present invention. The electrowinning unit operation 500 includes an electrowinning anode 182, an electrowinning cathode 162, a soluble-metal-ion-generating electrolyte 125, an electrowinning anode lead 222, an electrowinning cathode lead 242, a rectifier 202, and a waveform generator 321.

The soluble-metal-ion-containing electrolyte 125 is in fluid communication with the electrowinning anode 162, the electrowinning cathode 182, the electrowinning unit operation 500, and the electrolyte balancing tank 305. The machining unit 105 is in fluid communication with the electrowinning unit 500 (FIG. 2), such that the electrolyte 125 of the electrowinning unit operation 500 is the same electrolyte 125 that is used for the electrochemical machining operation 105. The electrowinning anode 162 and the electrowinning cathode 182 are electrically connected to a waveform generator 321 by an anode lead 242, a cathode lead 222, and a rectifier 202.

During operation, the waveform generator 321 applies a voltage or current waveform between the electrowinning anode 162 and the electrowinning cathode 182 via the rectifier 202, the electrowinning anode lead 242, and the electrowinning cathode lead 222. The applied waveform causes electrochemical reactions to occur between the electrowinning anode 162, the electrowinning cathode 182, and the soluble-metal-ion-containing electrolyte 125, as earlier described with exemplary reactions for divalent and trivalent metals. At the electrowinning anode 162, $H_2O$ is converted into oxygen, protons, and electrons. At the electrowinning cathode 182, oxidized metal ions in the electrolyte 125 gain electrons and are plated onto the electrowinning cathode 182. Thus, the combination of the reaction at the electrowinning cathode 182 and the reaction at the electrowinning anode 162 leads to the production of oxygen gas and the plating of dissolved metal ions from the electrolyte 125 onto the electrowinning cathode 182.

The waveform generator 321 can provide pulsed waveforms having an adjustable duty cycle and amplitude. The waveform generator 321 can provide bipolar voltages to the electrowinning anode 162 and the electrowinning cathode 182.

In some embodiments, the electrowinning cathode 182 can be made of stainless steel, and the electrowinning anode 162 can be dimensionally stable anode (DSA®). DSA® is a registered trademark of Industrie De Nora S.p.A. DSA® anodes can be made of titanium and coated with a mixed metal oxide such as Ru—Ir-oxide.

In some embodiments, the anode workpiece 160 of the machining unit 105 can be made of a copper alloy (e.g., C18000 or C18200) and the electrowinning anode(s) 162 can be made of a titanium mesh coated with a mixed metal oxide (MMO). The electrowinning cathode(s) 182 can be made of steel. In some embodiments, the electrowinning anode 162 can be a mesh anode or a flat plate anode or an anode of another geometry.

The number of electrowinning anodes 162 can be one greater than the number of electrowinning cathodes 182 (e.g., the number of electrowinning anodes 162 can be four and the number of electrowinning cathodes 182 can be three). In some embodiments, the pH of the soluble-metal-ion-containing electrolyte 125 is maintained at a pH of about one, or another suitable pH for keeping the dissolved metal soluble.

Without wishing to be bound to the theory, the quality of the surface finish achieved during an electrochemical polishing process may be related to the concentration of the metal ions dissolved in the electrolyte 125. The surface polishing can be characterized by means of $R_a$ measurement collected with a profilometer to determine surface roughness. The $R_a$ value can represent the mean absolute deviation of the profile collected by the profilometer. For example, in the case of C18000 with an electrolyte 125 composed of 100 g/L of $NaNO_3$, 100 g/L of $NH_4NO_3$, and 1% concentration by volume of $HNO_3$ being machined using a waveform with a voltage of about 30V, a frequency in the range of about 100-1000 Hz, an anode to cathode gap of about 0.5 inches, and a duty cycle in the range of about 10-30%. If the $Cu^{2+}$ ion concentration in the electrolyte 125 is lower than about 1600 ppm, the $R_a$ value is about 0.9 µm. If the $Cu^{2+}$ ion concentration is raised to about 2100 ppm, the $R_a$ value is about 1.0 µm.

Accordingly, the electrowinning process in the electrowinning unit 500 can be used to control and/or fine tune the metal ion concentration of the electrolyte 125 for the machining unit 105, which thus impacts the surface polish of the workpiece 160. In some embodiments, the electrowinning deposition efficiency can be maximized by adjusting the concentration of dissolved metal ions in the electrolyte. In some embodiments, the concentration of dissolved metal ions can be adjusted to optimize the quality and/or speed of an electrochemical machining process, as well as the deposition efficiency of an electrowinning process. In particular, the duty cycle of the electrowinning process can be adjusted to control the removal rate of metal ion removal in the electrowinning unit 500 (i.e., the rate at which the metal is taken out of solution and plated onto the electrowinning cathode 182). In one embodiment, the waveform parameters of both the machining unit 105 and the electrowinning unit 500 are coordinated such that rate of metal ion solubilization in the electrolyte 125 in the machining unit 105 is approximately equal to the rate at of metal ion removal from the electrolyte 125 in the electrowinning unit 500, thereby generally maintaining the ion concentration of the electrolyte 125 at a predefined level or acceptable range throughout the e electrochemical machining and recycling system 300.

Similar to the relationship between metal ion concentration and surface roughness, there is a relationship between metal ion concentration and electrowinning deposition efficiency. Accordingly, adjusting the concentration of dissolved metal ions in the electrolyte can also be used to modify the efficiency of deposition in the electrowinning process. In some embodiments, the concentration of dissolved metal ions can be adjusted to optimize the quality and/or speed of an electrochemical machining process, as well as the deposition efficiency of an electrowinning process.

Any of a variety of factors, singly or in combination, can be used to adjust or maintain the metal ion concentration in the electrolyte 125. For example, the parameters of the electrowinning unit operation 500 (e.g. the shape of the voltage or current waveform applied to the electrowinning cathode 182 and electrowinning anode 162, the duty cycle of the voltage or current waveform applied to the electrowinning cathode 182 and electrowinning anode 162, or the number of electrowinning cathodes 182 or anodes 162) can be varied to keep the dissolved copper (or other metal ion) concentration within a predetermined range. Alternatively, or in addition to, the parameters in the electrochemical machining unit operation 105 (e.g. the shape of the voltage or current waveform applied to the anode workpiece 160 and the cathode tool 180, the duty cycle of the voltage or current waveform applied to the anode workpiece 160 and cathode tool 180) can be varied.

By coordinating the machining and electrowinning processes, the machining and electrowinning units of the electrochemical machining and recycling system 300 can be set to run in a generally self-sustaining manner (continuously or otherwise) for extended periods of time, or example 1, 2, or 3 days, or more, without the need to remove sludge or replace the electrolyte. In some embodiments, a duty cycle or other parameter of an electrochemical machining process can be adjusted to control the concentration of dissolved metal ions in an electrolyte. In some embodiments, a duty cycle or other parameter of an electrowinning process can be adjusted to control the concentration of dissolved metal ions in an electrolyte. In some embodiments, one or more parameters in both the electrochemical machining process and also the electrowinning process can be adjusted to control the concentration of dissolved metal ions in an electrolyte.

In some embodiments, a polypropylene filter (not shown) is positioned between the electrochemical machining unit operation 105 and the electrowinning unit operation 500 to retain insoluble, non-sludge particles released during an electrochemical machining process taking place in the electrochemical machining unit operation 105. Such particles could be insoluble components of the machined material, and/or contaminants in the system.

In some embodiments, deposition of dissolved metal on the cathode tool 180 during the electrochemical machining process can be prevented or reduced by periodically deactivating the electrochemical machining unit operation 105 to facilitate metal dissolution from the cathode tool 180. In some embodiments, deposition of dissolved metal on the cathode tool 180 can be prevented by applying a reverse voltage or reverse voltage pulses to the cathode tool 180 without negatively impacting the desired surface finish on the anode workpiece. In some embodiments, deposition of dissolved metal on the cathode tool 180 can be prevented by incorporating a pulse reverse voltage into the waveform parameters for the electrochemical machining unit operation 105 to continuously remove metal plated on the cathode tool 180, while maintaining the desired surface finish on the anode workpiece.

Figure 7:
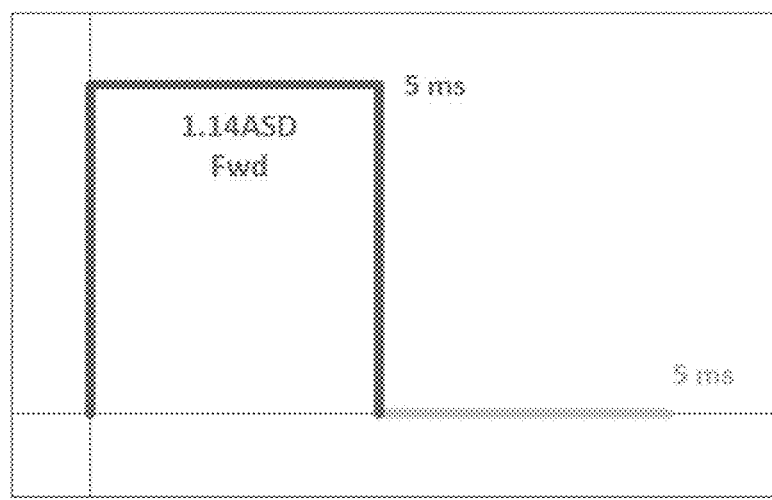
FIG. 7 shows a pulsed waveform used in an electrowinning process, according to an illustrative embodiment of the invention.

FIG. 7 shows an example of a pulsed waveform used in connection with an electrowinning unit operation 500 in accordance with an embodiment of the invention. The pulsed waveform shown in FIG. 7 is a square pulse shape, having a peak amplitude of 1.14 ASD (i.e. amperes per square decimeter or $A/dm^2$), and a duty cycle of 50% at 100 Hz. The pulsed waveform shown in FIG. 7 has a forward pulse with a duration of 5 ms, followed by a rest period of 5 ms before repeating. In some embodiments, the pulsed waveforms can include a forward pulse, a reverse pulse, and a rest period. For example, the pulsed waveform can have a 5 ms forward pulse, followed by a rest period of 1 ms, and then a reverse pulse of 1 ms, and another rest period of 3 ms before repeating. In some embodiments, the pulsed waveform can be a DC waveform with a 100% duty cycle. In various embodiments, the pulsed waveform can be used in connection with the electrowinning of C18000 copper alloy or SAE4150 steel. In some embodiments, the duty cycle can be varied between 0 and 100%. In some embodiments, the peak amplitude can be specified in amperes or amperes per unit area. In some embodiments, the shape of the pulsed waveform can be square, triangular, sawtooth, sinusoidal, or any combination thereof.

Figure 8:
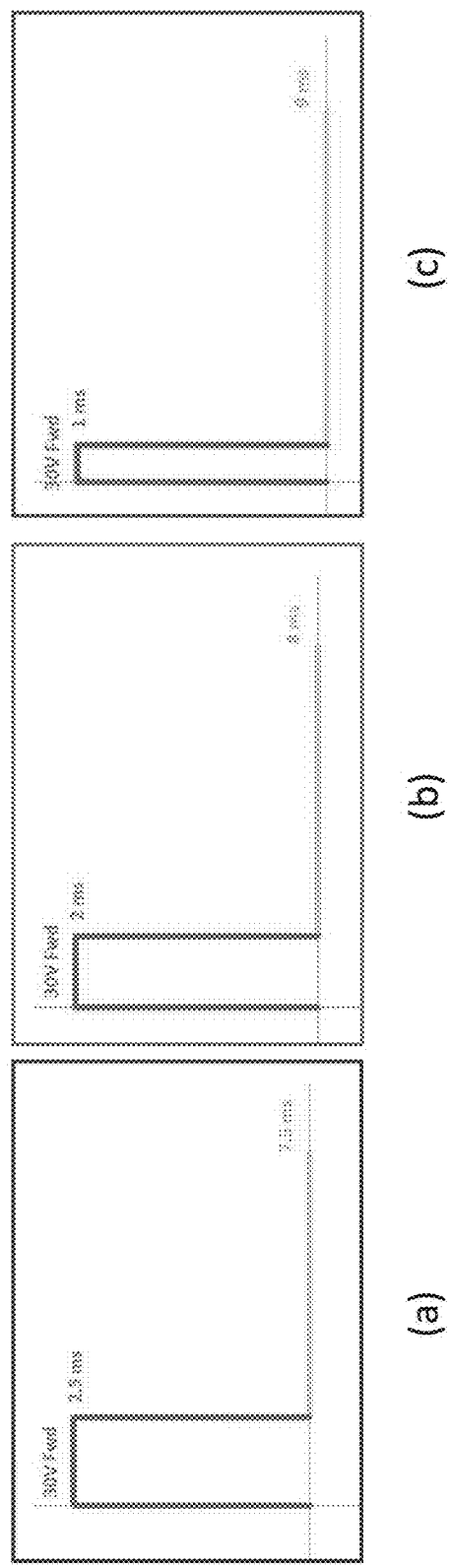
FIG. 8 shows a pulsed waveform used in an electrochemical machining process, according to an illustrative embodiment of the invention.

FIGS. 8A-8C show examples of pulsed waveforms used in connection with an electrochemical machining unit operation 105 in accordance with an embodiment of the invention. The pulsed waveforms shown in FIGS. 8A-8C have a square pulse shape, a peak amplitude of 30 volts, and varying duty cycle at a frequency of 100 Hz. The duty cycles shown in FIGS. 8A-8C vary between 10% and 25%. The pulsed waveforms shown in FIG. 8A-C are forward (e.g., anodic) pulses with durations of 2.5 ms, 2 ms, and 1 ms respectively, followed by a rest period. In some embodiments, the pulsed waveforms can include a forward pulse, a reverse pulse, and a rest period. For example, the pulsed waveform can include a 2.5 ms forward pulse, followed by a rest period of 1 ms, and then a reverse pulse of 1 ms, and another rest period of 5.5 ms before repeating. In some embodiments, the pulsed waveform can be a DC waveform. In some embodiments, the pulsed waveform can be used in connection with the electrochemical machining of C18000 copper alloy or SAE4150 steel. In some embodiments, the duty cycle can be varied between 0 and 100%. In some embodiments, the shape of the pulsed waveform can be square, triangular, saw-tooth, sinusoidal, or any combination thereof. In some embodiments, the amplitude can be specified in volts.

In some embodiments, the pulsed waveforms used in connection with an electrochemical machining unit operation 105 or an electrowinning unit operation 500 can be any of those shown in U.S. Pat. No. 6,402,931 to Zhou, U.S. Published Patent Application No. 2011/0303553 by Inman, or U.S. Pat. No. 6,558,231 to Taylor, the entire disclosures of which are each hereby incorporated by reference in their entireties.

In some embodiments, the electrochemical machining unit operation 105 is applied to materials that form passive surface layers, or strongly passive surface layers. In some embodiments, the pulsed waveforms are tuned to account for the beginning stages of the electromachining process, where the surface roughness is large and consequently the diffusion boundary follows or conforms to the surface profile, and the later stages of the electromachining process where the diffusion boundary layer can be larger than the surface profile due to removal of surface asperities.

Figure 9:
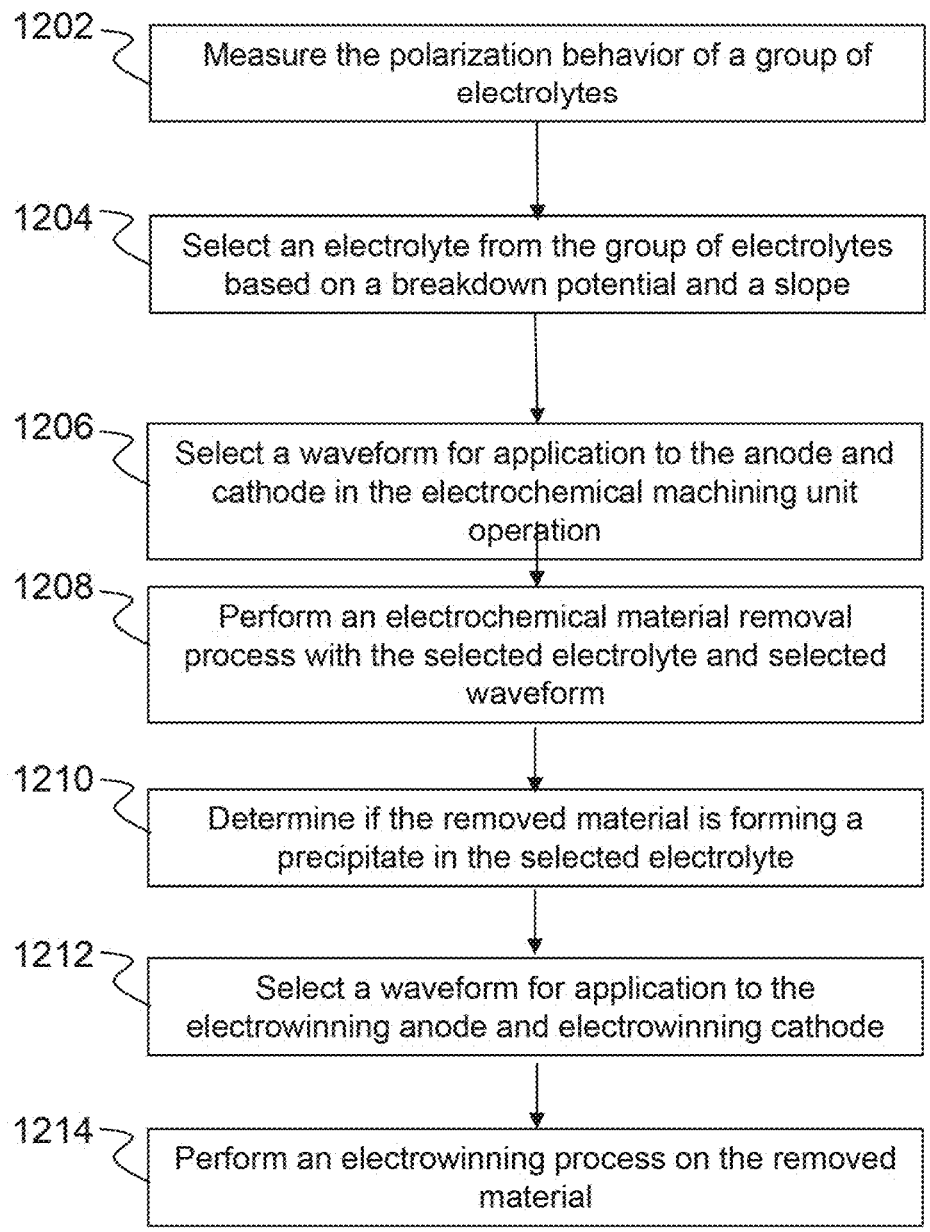
FIG. 9 describes a method of selecting an electrolyte, according to an illustrative embodiment of the claimed invention.

FIG. 9 is a flow chart showing a method of selecting an electrolyte in accordance with an illustrative embodiment of the invention. The method includes measuring polarization behavior of a group of electrolytes (Step 1202). In some embodiments, the polarization behavior of the electrolytes is characterized by a polarization curve. A detailed discussion of polarization curves can be found in a publication by Sun et al. ("Investigation of Electrochemical Parameters Into an Electrochemical machining process," Technical Papers of NAMRI/SME, Volume XXVI, 1998), the entirety of which is herein incorporated by reference in its entirety.

The method also includes selecting an electrolyte from the group of electrolytes based on a breakdown potential and a slope (e.g. $\Delta I/\Delta E$, where $\Delta I$ is a change in current and $\Delta E$ is a change in electrical potential) (Step 1204). Larger values for $\Delta I/\Delta E$ generally suggest more suitable electrolytes.

The method also includes selecting a waveform to be applied to the anode 160 and cathode 180 in the electrochemical machining unit 105 (Step 1206). The selected waveform can be a DC waveform, a cathodic pulse, an anodic pulse, or any combination thereof.

The method also includes performing an electrochemical material removal process with the selected electrolyte (Step 1204) and the selected waveform (Step 1208). The method also includes determining if the removed material is forming a precipitate in the selected electrolyte (Step 1210). In some embodiments, if the removed material is forming a precipitate in the selected electrolyte, a new waveform is selected (Step 1206) where the removed material is solubilized in the electrolyte in connection with the new waveform, and the method proceeds as before. In some embodiments, if the removed material is forming a precipitate in the selected electrolyte, a new electrolyte is selected (Step 1204) where the removed material is solubilized in the new electrolyte and the method proceeds as before.

The method also includes selecting a waveform for application to an electrowinning cathode 182 and an electrowinning anode 162 (Step 1212). The selected waveform can be a DC waveform, a cathodic pulse, an anodic pulse, or any combination thereof.

The method also includes performing an electrowinning process on the removed material (Step 1214). In some embodiments, if the electrowinning of the removed material is unsatisfactory, a new waveform is selected (Step 1212)

and the method proceeds as before using the new waveform. In some embodiments, if the electrowinning of the removed material is unsatisfactory, a new electrolyte is selected (Step 1204) and the method proceeds as before using the new electrolyte.

Figure 10:
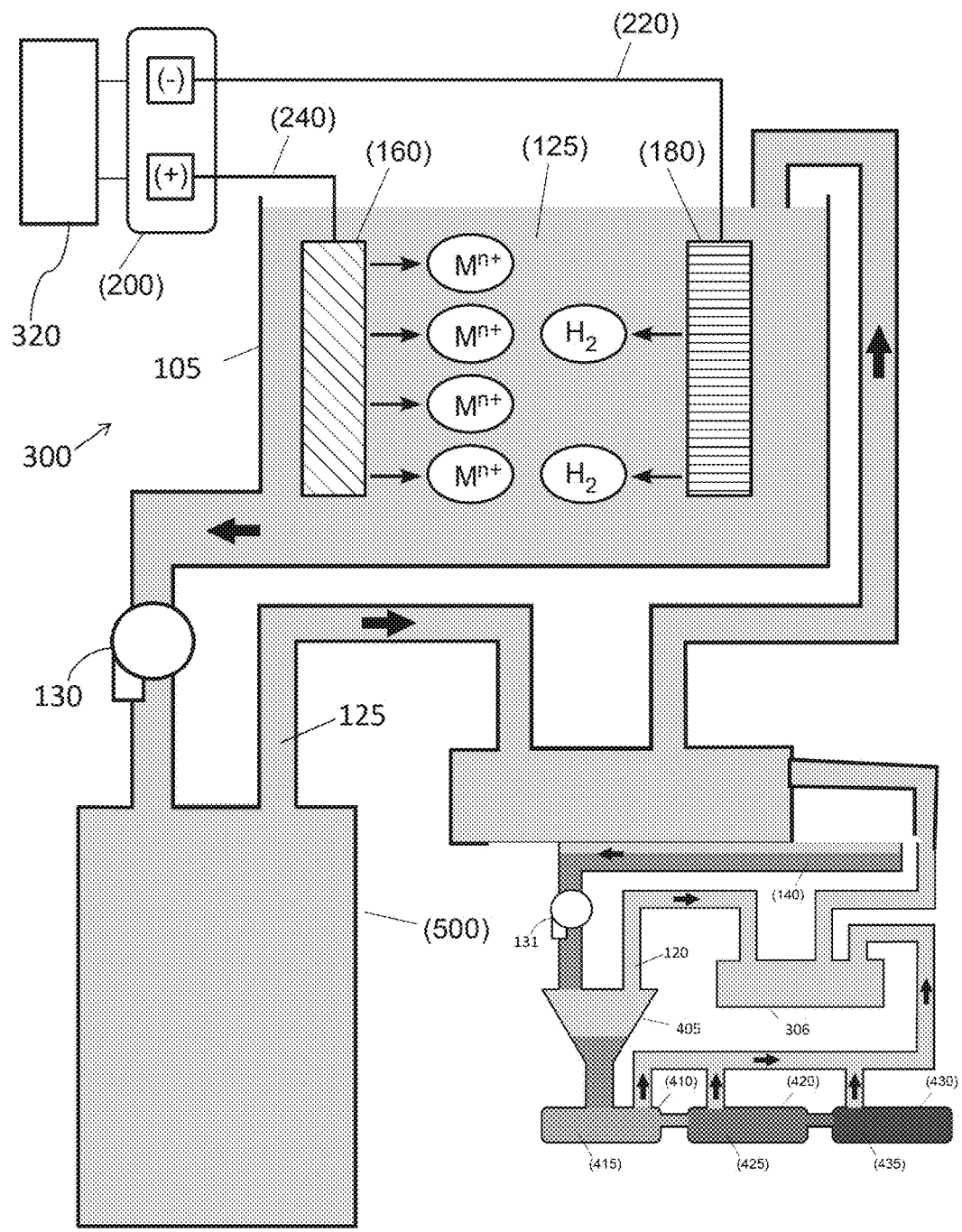
FIG. 10 is block diagram of a hybrid electrochemical machining and recycling apparatus, according to an illustrative embodiment of the invention.

FIG. 10 schematically depicts a hybrid embodiment of an electrochemical machining and recycling system where features of the electrochemical machining and recycling system of FIG. 2 are used in conjunction with a clarifier 405 and filter 410 similar to those shown in the system of FIG. 1. This may be incorporated off of the (optional) balancing tank 305 to remove impurities from the electrolyte that that are not removed by the electrowinning unit 500, regardless of cause (e.g., malfunction or degradation due to need for maintenance, lack of electrochemistry to support removal, or lack of economic drive to employ electrochemistry for removal). The pump 131 may control if and when the clarifier 405 is run. The pump 131 may be run in parallel with the electrochemical machining and recycling system at all times, run in parallel when warranted by the build up of contaminants either through sensory feedback or an open loop maintenance regiment, run in lieu of the recycling system to allow unimpeded machining operation, for example during recycling maintenance, or it may be run while both the machining and recycling operations are off line.

The present invention will be illustrated by the following examples, which are intended to be illustrative and not limiting.

Example 1

Figure 4:
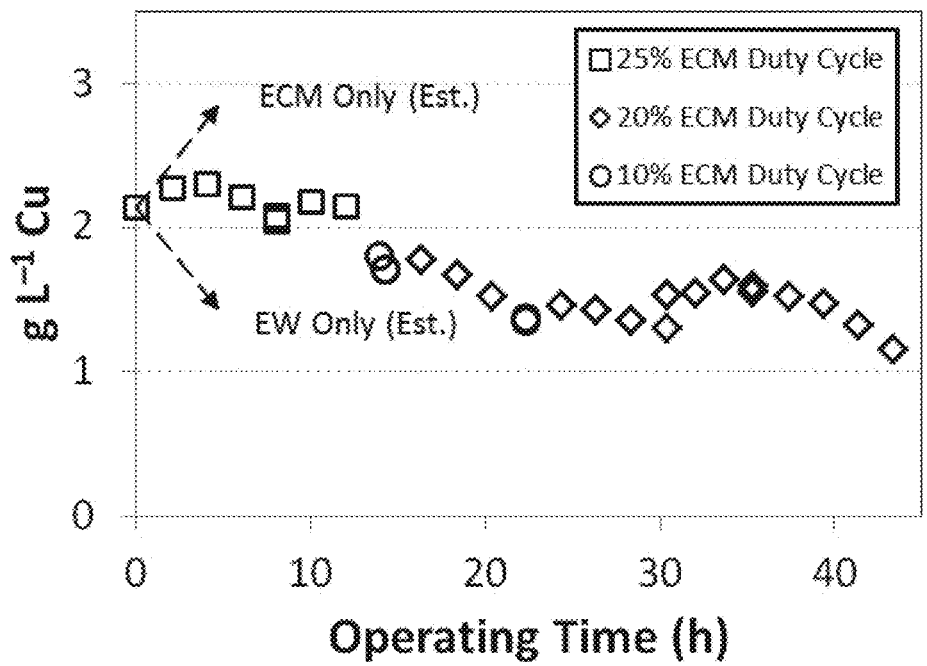
FIG. 4 shows a graph of dissolved metal ion concentration as a function of time, according to an illustrative embodiment of the invention.

FIG. 4 presents the evolution of the $Cu^{2+}$ concentration as part of a working example of an electrochemical machining and recycling system for a C18000 copper alloy workpiece (rod stock) in an implementation with a 43 L working volume. The apparatus was charged with an aqueous working electrolyte composed of 100 g/L sodium nitrate (technical grade), 100 g/L ammonium nitrate (technical grade), and 1% v/v nitric acid (ACS grade, ~70%), and C18000 alloy was electrochemically machined in the electrolyte until the $Cu^{2+}$ concentration reached approximately 2 g/L (time 0). Both the electrochemical machining (ECM) and electrowinning (EW) units were then operated simultaneously, for 6-8 hours per day, over a span of six days. Samples were withdrawn from the system periodically and analyzed for the $Cu^{2+}$ concentration by inductively coupled plasma optical emission spectroscopy (ICP-OES) to obtain the data used to generate FIG. 4.

The EW unit was operated with three cathodes and four anodes at a uniform electrode spacing of 16 mm, with a forward-pulsed electrical waveform of 1.144 $A/dm^2$ peak current density, 50% duty cycle, and 100 Hz frequency throughout operation. The ECM unit was operated with a counterelectrode positioned approximately 25 mm from a C18000 rod, using a forward-pulsed electrical waveform of 20 $V_{peak}$ applied potential at 100 Hz frequency. The duty cycle of the ECM unit waveform was varied between 10% and 25%, as indicated in FIG. 4, over the course of system operation to adjust and maintain the $Cu^{2+}$ concentration in a range near a target value of 1.5 g/L.

The effectiveness of pairing ECM and EW operations for prolonged, sustained use is highlighted by the dashed arrows included in FIG. 4 (at the y-axis), which indicate the significant rate of change of the $Cu^{2+}$ concentration that would have been expected if either of the two unit operations (ECM or EW) had been operated in the absence of the other, starting at the initial system copper concentration. Given that a steady $Cu^{2+}$ concentration was maintained throughout operation of the system, it is demonstrated that the dissolved metal concentration can, in fact, be well-controlled by tuning of the applied electrical parameters, in this case through adjustment of the ECM unit parameters.

This example demonstrates how the combined ECM and EW processes of this disclosure can be used to sustain such processes over an extended period of time. As shown in FIG. 4, during the first 12 hours of operation, the ECM duty cycle is 25% and the $Cu^{2+}$ ion concentration oscillates at about 2200 ppm. During the next 10 hours, the ECM duty cycle is reduced to a value in the range of 10-20% (without changing the EW parameters), which led to a gradual decrease in the $Cu^{2+}$ concentration. During the last 21 hours of operation, for an ECM duty cycle of 20%, the $Cu^{2+}$ ion concentration was generally maintained within a window of 1200-1350 ppm. During operation, the combined ECM and EW processes thus maintained the $Cu^{2+}$ ion concentration between 1000 and 2500 ppm over a time period of about 40 hours $Cu^{2+}$ ion. Further, adjustment of the ECM duty cycle caused the $Cu^{2+}$ ion concentration to be maintained within a concentration window with a width of about 150 ppm for an extended period of time.

The $Cu^{2+}$ concentration exhibits a roughly parabolic profile during each day of operation, due to a progressive decrease in the active surface area of the C1800 rod stock being electrochemically machined. It should be appreciated that this roughly parabolic shape of the change in copper concentration (e.g., between $t_0$ and $t_2$, $t_8$ and $t_{14}$, $t_{14}$ and $t_{22}$, etc.) is unique to the rod shape of the anode workpiece, and such variation would not necessarily be evident for other anode workpiece geometries or for anode workpieces which do not exhibit a change in active surface area.

Example 2

Figure 5:
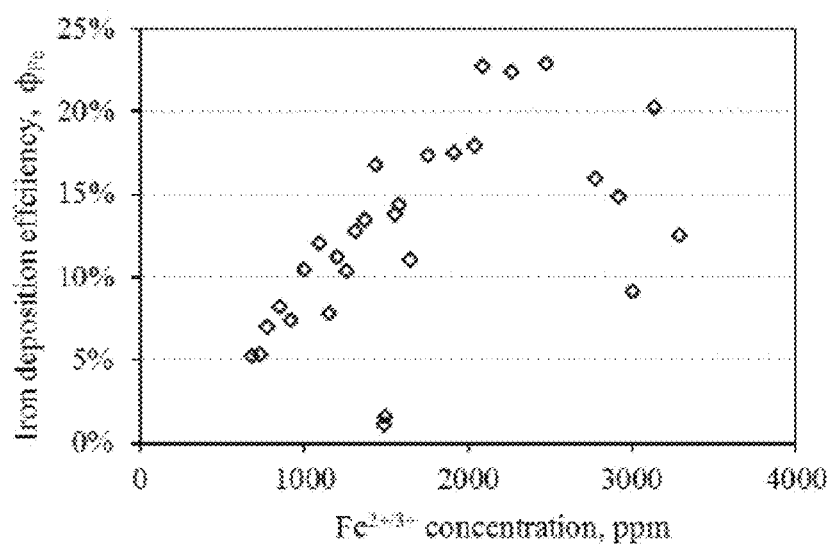
FIG. 5 shows a graph of electrowinning deposition efficiency as a function of dissolved metal ion concentration, according to an illustrative embodiment of the invention.
Figure 6:
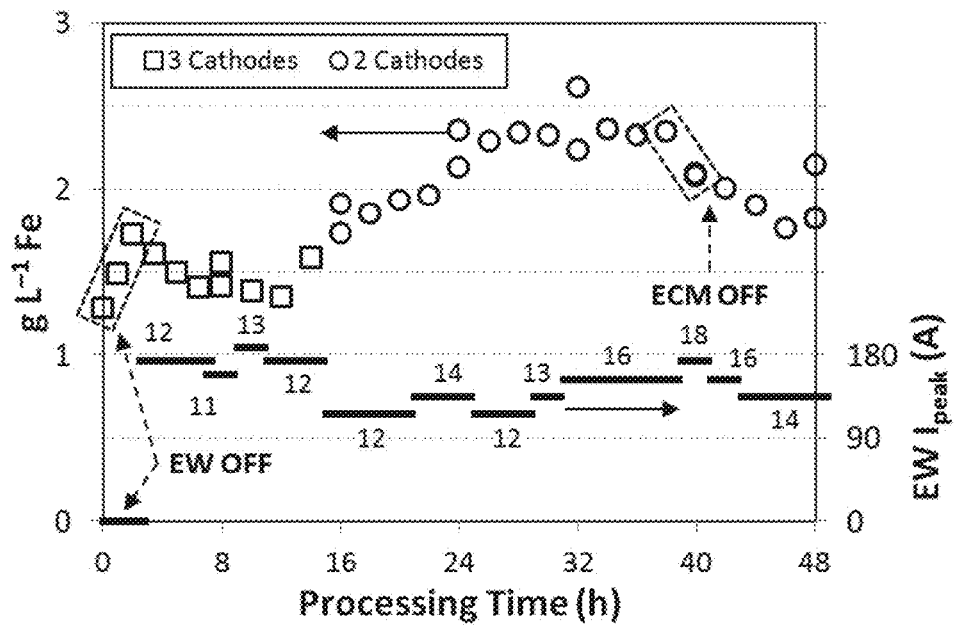
FIG. 6 shows a graph of dissolved metal ion concentration as a function of time, according to an illustrative embodiment of the invention.

FIGS. 5 and 6 present data related to a working example of an electrochemical machining and recycling system for a SAE4150 Cr—Mo alloy steel workpiece in an implementation with a 43 L working volume. The upper data (squares and circles) of FIG. 6 presents the evolution of $Fe^{n+}$ concentration over time. The apparatus was charged with an aqueous working electrolyte composed of 200 g/L ammonium sulfate (technical grade), 5 g/L sulfuric acid (concentrated, technical or ACS grade), and 2.65 g/L citric acid (technical grade), and SAE4150 alloy was electrochemically machined in the electrolyte until the $Fe^{n+}$ concentration reached approximately 1.5 g/L. Both the ECM and EW units were then operated simultaneously, for 6-8 hours per day, over a span of six days, except where indicated to the contrary in FIG. 6.

Samples were withdrawn from the system periodically and analyzed for the $Fe^{n+}$ concentration by ICP-OES to obtain the data used to generate FIG. 6. The ECM unit was operated with a counterelectrode positioned approximately 25 mm from an SAE4150 rod, using a forward-pulsed electrical waveform of 30 $V_{peak}$ applied potential, with a 60% duty cycle at a frequency of 100 Hz throughout operation. The EW unit was operated either with three cathodes and four anodes ($t_0$ to $t_{16}$) or with two cathodes and three anodes ($t_{16}$ to $t_{48}$), in either case with uniform electrode spacing of 16 mm. The EW anode was titanium mesh coated with a mixed metal oxide, and the electrowinning cathode was brass, offset by about 62 mm. The EW waveform used was forward-pulsed only, with duty cycle 50% and frequency of 100 Hz. The rate of metal extraction of the EW unit was adjusted during operation as indicated in FIG. 6, either by changing the number of cathodes or by adjusting the waveform peak current density between 11-18 A/dm², to control the $Fe^{n+}$ concentration to a target range near 2 g/L.

At the outset of the demonstration, the EW unit was left inactive for approximately 2-3 hours to allow rapid accumulation of $Fe^{n+}$ in the electrolyte (through running the ECM unit), toward the 2 g/L target. Later in the demonstration, around 36 h elapsed, the ECM unit was left inactive for approximately 2 h to allow the electrowinning unit to draw the $Fe^{n+}$ concentration down toward that same target. Other than these periods, both the EW and ECM units were both active.

The lower data of FIG. 6 plots the total peak current applied to the electrowinning unit operation over the course of the demonstration, with numerical annotations indicating the resulting peak current density for the number of cathode plates installed at a given point in the processing. As with EXAMPLE 1, given that a steady $Fe^{n+}$ concentration was maintained throughout operation of the system, it has been further demonstrated that control over the dissolved metal concentration can be maintained via tuning of the applied electrical parameters, in this case through adjustment of the EW unit parameters FIG. 6 shows that during a first two to three hours of operation, only the ECM process was active, so the iron concentration in the solution increased to about 1700 ppm (1.7 g/L) by electrochemical machining of the SAE4150 rod with the EW unit switched off. FIG. 6 shows that the electrowinning unit operation was turned on with three cathodes each operating at a peak current density of 12 A/dm² and 50% duty cycle at about the two-three hour mark, which caused the iron concentration to fall from about 1700 ppm to about 1350 ppm (1.7 g/L to about 1.35 g/L) over the subsequent 12 hours of operation, during which the peak currently was adjusted to 11 A/dm² and then 13 A/dm². The fall in iron concentration can be indicative of too great a rate of iron deposition in the electrowinning unit operation relative to iron dissolution in the electrochemical machining unit operation.

FIG. 6 shows that after approximately the 16 hour processing time, one electrowinning cathode-electrowinning anode pair was removed from the electrowinning unit operation and the peak current was adjusted to maintain the same 12 A/dm² peak current density on each of the two remaining cathodes, and the $Fe^{2+/3+}$ concentration increased. The current applied to the EW anodes and EW cathodes could have been adjusted to counteract the impact of the reduced cathode active area in this situation. FIG. 6 shows that over the next 24 hours of operation, hours 14 to 38, the iron concentration began to rise sharply due to the removal of one cathode from the EW unit, but the rate of iron concentration increase gradually slowed until the iron concentration finally leveled off at about 2350 ppm (2.35 g/L), up from about 1350 ppm (1.35 g/L)), as the peak current density gradually increased from 12 to 18 A/dm² in response to the increase in iron concentration. FIG. 6 also shows that during the next two hours of operation (hours 38 to 40), the ECM unit was turned off, allowing the iron concentration to fall due to iron electrodeposition in the EW unit in the absence of any concurrent process in the ECM unit to replenish the removed iron. FIG. 6 shows that the EW unit operation is then re-engaged, after which the iron concentration remains in a range of about 1800-2000 ppm (hours 40-48).

FIG. 6 also shows the impact of turning off both the ECM and EW units for a period of time (e.g., overnight). In each case, the iron concentration increases, as shown at hours 8, 16, 32, 40 and 48. The increase in iron concentration can be attributed to dissolution of iron electrodeposited on the cathode tool 180 in the electrochemical machining unit operation 105.

FIG. 5 shows a graph of $Fe^{2+/3+}$ deposition efficiency in the EW unit, plotted as a function of the $Fe^{2+/3+}$ concentration in the electrolyte. FIG. 5 shows that the $Fe^{2+/3+}$ electrowinning deposition efficiency can be maximized by adjusting the concentration of $Fe^{2+/3+}$ to be about 2000 ppm (although higher electrowinning deposition efficiency at higher concentrations may be possible).

Example 3

Figure 11:
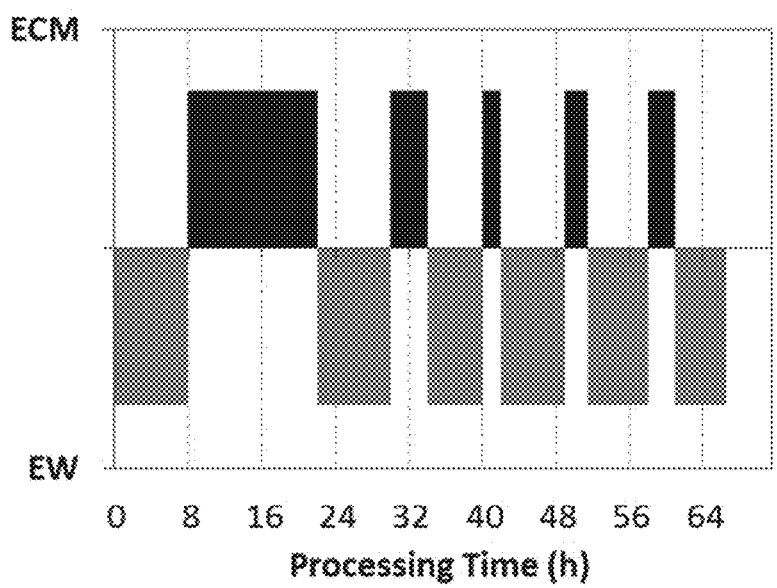
FIG. 11 shows the operating times for alternating electrochemical machining and electrowinning processes according to an embodiment of the invention.
Figure 12:
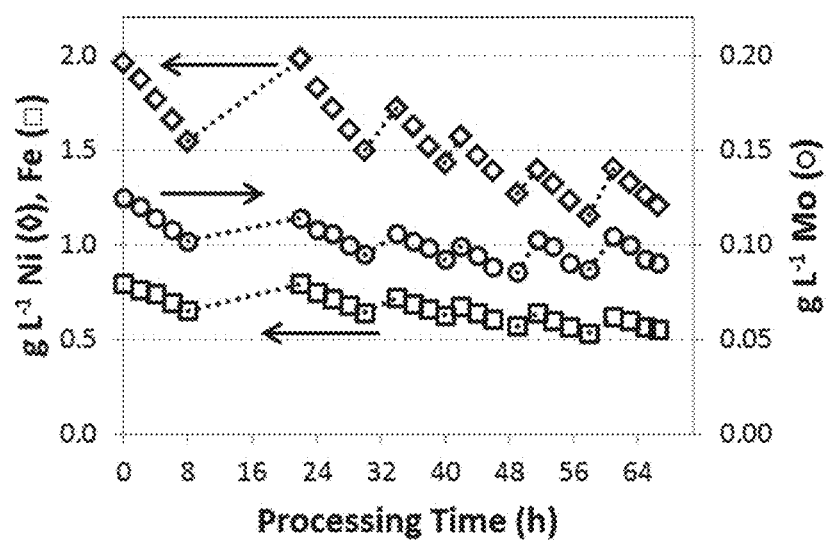
FIG. 12 shows a graph of dissolved metal ion concentration as a function of processing time, according to the embodiment of FIG. 11.

FIGS. 11 and 12 present data related to a working example of an electrochemical machining and recycling system for IN718 nickel superalloy. The ECM and EW units were operated sequentially instead of simultaneously, unlike Examples 1 and 2. An implementation of the technology with a 15-liter working volume was charged with an aqueous working electrolyte composed of 120 g/L citric acid, 20 g/L boric acid, 1.5% v/v $HNO_3$, and 1.3% v/v HCl, with the initial pH adjusted to 3.0 with ammonium hydroxide. IN718 alloy was electrochemically machined in the electrolyte until the total dissolved metals concentration was approximately 3 g/L, and then the electrowinning and ECM units were then operated alternately according to the program schematic shown in FIG. 11. The downward-projecting bars indicate the processing time for the EW operating periods, and the upward-projecting bars indicate the processing time for the ECM operations (except for the initial period to achieve the initial total dissolved metals concentration of about 3.0 g/L). Though shown consecutively in FIGS. 11 and 12, the actual processing occurred over a span of several days, with the system sitting idle overnight. These idle times are excluded from Figures.

The waveforms used for the EW and ECM operations were uniform for each processing period. The ECM unit used a voltage-controlled, pulse-reverse waveform, with 40 V and 20 V peak potentials and 0.9 ms and 1.0 ms on-times for the forward and reverse pulses, respectively, and a 1.0 ms off time following each forward pulse. The EW unit used a current-control, forward-pulse only waveform with a peak current density of 50 A/dm², a frequency of 100 Hz, and an 80% duty cycle. The electrolyte pH was maintained at approximately 3.0 by periodic addition of nitric acid.

Samples were withdrawn before, during, and after each EW phase for metals concentration measurements by ICP-OES, with the resulting data presented in FIG. 12. The points of alternation between operation of the ECM and electrowinning units were selected so as to maintain dissolved nickel and iron concentrations in the vicinity of 1.5 g/L and 0.75 g/L, respectively. As in Example 1 and Example 2, the data provided in FIG. 12 clearly demonstrates the ability of the methodology disclosed herein to enable recovery of alloy constituent elements. The data also illustrates the compositional flexibility of the electrolyte and the ability to control dissolved metal content of the electrolyte using the disclosed methods. The sequential mode of operation in this Example 3, in contrast to the simultaneous mode used in the prior Examples 1 and 2, also highlights the flexibility of the disclosed methodology for coordinating the practical aspects of the processing activities and various ways.

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method for recycling metallic material produced by an electrochemical material removal process, the method comprising the steps of:
    flowing an electrolyte solution between an anode workpiece and a cathode tool in a first electrolytic process, the first electrolytic process comprising applying a first electrolytic current and voltage between the anode workpiece and the cathode tool and thereby causing metal ions to be removed from the anode workpiece and dissolved and substantially retained in the electrolyte solution;
    flowing the electrolyte solution with the metal ions therein between an electrowinning cathode and an electrowinning anode in a second electrolytic process, the second electrolytic process comprising applying a second electrolytic current and voltage comprising a pulsed current and voltage between the electrowinning cathode and the electrowinning anode and thereby causing the metal ions to be removed from the electrolyte solution and deposited onto the electrowinning cathode; and
    adjusting the second pulsed voltage waveform of the second electrolytic process to cause the rate at which the dissolved metal ions are deposited onto the electrowinning cathode to be approximately equal to the rate at which metal ions are removed from the anode workpiece during the first electrolytic process.

2. The method of claim 1, further comprising reflowing the electrolyte solution between the anode workpiece and the cathode tool of the first electrolytic process after the second electrolytic process.

3. The method of claim 1, further comprising selecting the first electrolytic current and voltage to include at least one of a pulsed direct current and voltage and a pulse reverse current and voltage.

4. The method of claim 1, further comprising selecting the second electrolytic current and voltage to further include at least one of a direct current and voltage and a pulse reverse current and voltage.

5. The method of claim 1, further comprising applying a bipolar waveform between the anode workpiece and cathode tool to prevent at least some of the metal ions removed from the anode workpiece from being deposited onto the cathode tool.

6. The method of claim 1, wherein adjusting the second pulsed voltage waveform comprises adjusting a duty cycle thereof to about 10% to about 25%.

7. The method of claim 1, wherein the anode workpiece comprises copper or a copper alloy, iron or an iron alloy, or nickel or a nickel alloy.

8. The method of claim 7, and wherein the anode workpiece comprises copper or a copper alloy and the electrolyte comprises $NaNO_3$, $NH_4NO_3$, and $HNO_3$.

9. The method of claim 7, wherein the anode workpiece comprises iron or an iron alloy and the electrolyte comprises ammonium sulfate, sulfuric acid, and citric acid.

10. The method of claim 7, wherein the anode workpiece comprises nickel or a nickel alloy and the electrolyte comprises citric acid, boric acid, $HNO_3$, and HCl.

11. The method of claim 2, wherein the first electrolytic process and the second electrolytic process are each run continuously for a period of at least twenty-four hours.

12. The method of claim 1, further comprising maintaining a concentration of the substantially dissolved metal ions of the electrolyte solution between about 1200 and about 1350 parts per million.

13. The method of claim 1, further comprising circulating the electrolyte at a flow rate of about 4.8 gallons per minute.

14. The method of claim 1, wherein the first electrolytic process and the second electrolytic process run simultaneously.

15. The method of claim 1 wherein the first electrolytic process and the second electrolytic process run sequentially or alternate.

* * * * *